Feb. 24, 1959   G. S. BRADLEY   2,874,678
RABBIT FEEDERS
Filed March 22, 1954
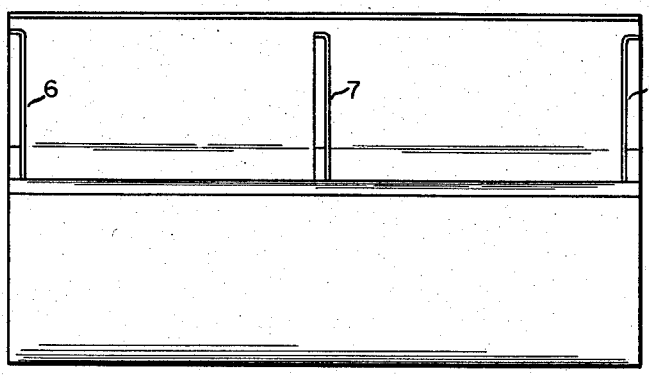
Fig. 1
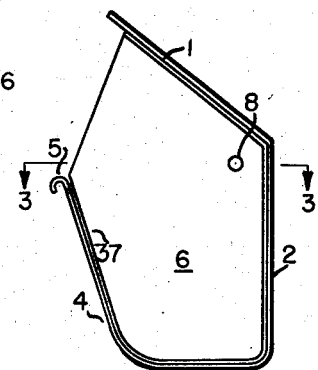
Fig. 2
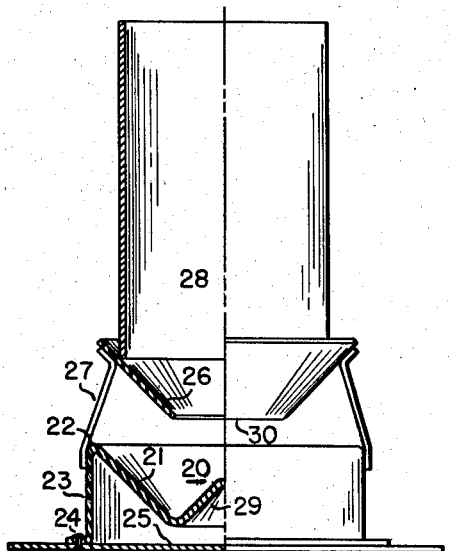
Fig. 4
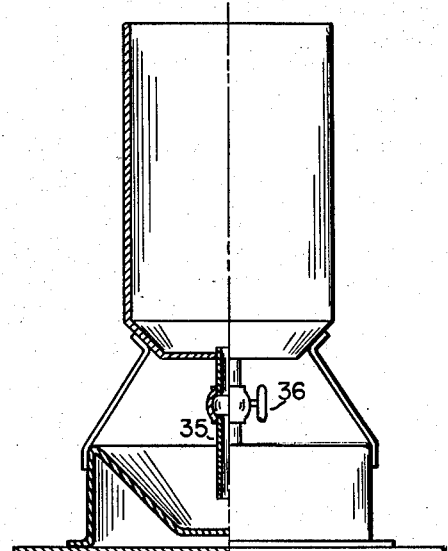
Fig. 5
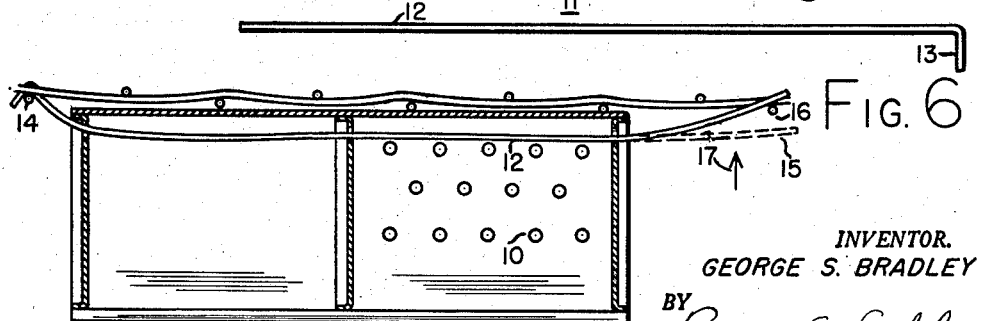
Fig. 3
Fig. 6
INVENTOR.
GEORGE S. BRADLEY
BY Bruno C. Lechler
Attorney

United States Patent Office 2,874,678
Patented Feb. 24, 1959

2,874,678

RABBIT FEEDERS

George S. Bradley, Rock Island, Ill.

Application March 22, 1954, Serial No. 417,538

2 Claims. (Cl. 119—61)

The invention relates to a container for food and water used in feeding rabbits and similar animals.

This feeder is designed to enable rabbit breeders to raise healthy litters with the minimum expenditures of time and cost of feed.

This feeder is designed to prevent contamination by preventing the young rabbits bodily entering the feed and the water container and thus contaminating their food supply. Yet, the food feeder affords the young rabbits and the doe ample room to consume the feed in the feeder—even to the very bottom of the container.

It is well known that slow growth, sickness, and loss of rabbits, is due largely to the contamination of the food and water by the rabbits. Pneumonia, caused by the rabbits getting into the water, also contributes to the mortality. This feeder prevents this by preventing the rabbits getting into the feeder bodily.

This feeder is adapted to be fastened to the inside of the screen door of the hutch and is easily removed for cleaning when the hutch door is opened. A novel fastener is provided for rapidly and easily attaching the feeder to the door.

The feeder has a sloping top that keeps out the rain and is so placed relative to the front edge of the feeder that a rabbit trying to hop over the front wall of the feeder strikes his head against the surface and desists.

This invention applies only to the feeding of rabbits and animals having similar reactions. A rabbit will never go into a feeder sideways. He always heads straight in and if he strikes his head in so doing, he will retreat and not enter the feeder bodily.

One of the features of the invention is that the rear side of the feeder is inclined forward at such an angle, and at such a distance relative to the top of the forward edge of the feeder that a large rabbit will be able to push his head down between the front edge and the inclined rear side to feed, but a small rabbit will not be able to climb over the front edge into the feeder.

The feeder can also be contaminated by the front paws of the rabbit. It has been discovered that if the front edge of the feeder offers a comfortable top surface, such as a flat surface or a cylindrical surface of a radius of at least a sixteenth of an inch, the rabbit will rest his paws on the surface but if the front edge is sharp he will place his paws in the feed. The reason for this is not known— it may be that the gentle surface feels pleasant to the rabbit while a sharp edge, extending between the pads on his paw irritates and so leads him to put his contaminated paws down inside the feeder.

In an alternate form of the feeder that is not attached to the door but placed on the floor, provision is made to prevent the feeder being pushed about, or overturned, by the rabbits as they poke at it with their snouts. This result is accomplished by adding a projecting plate to the underside of the feeder so that the forward legs of the rabbit rest on the plate while the rabbit is poking at the feeder.

The invention also provides a simple means for attaching the feeder to a wire mesh wall of the rabbit hutch which consists of a spring wire longer than the feeder that passes through holes in its end and has a bent end at one end of the wire. This bent end is hooked behind one vertical wire of the mesh to hold one end of the feeder against the wall and then, using the bent end as a convenient means to move the wire lengthwise, the other end is slipped behind another vertical wire to hold the other end of the feeder in place.

The object of the invention is to provide a feeder for rabbits and similar animals, suitable for use by both large and small animals of the same kind, that maintains food and water uncontaminated by permitting the animals ready access to the contents of the feeder but prevents or discourages any of them bodily entering the food container.

Another object of the invention is to provide a container which the animals cannot move about by poking with their snout, even though the feeder is not anchored to the floor.

Another object of the invention is to provide simple means for attaching and removing the feeder from a wire mesh wall.

Figure 1 shows a front elevation of one form of the feeder.

Figure 2 shows a side view of the same feeder.

Figure 3 is a plan view, partly in section, taken along lines 3—3 in Figure 2.

Figure 4 shows another form of the feeder in elevation and partly in section.

Figure 5 shows still another modification of the feeder.

Figure 6 shows the spring wire fastener.

In one form of the invention a metal sheet is bent to form an inclined upper section 1 of the rear wall, a lower vertical rear section 2, a bottom 3, an inclined sloping front wall section 4 forming a downwardly sloping inner face of the dish, and a rounded horizontal front edge 5. End pieces 6 are provided with flanges 37 that are attached to the sections 1, 2, 3, 4 of the metal sheet. The feeder may be divided into sections by partitions 7 that are essentially similar to the end piece 6. Holes 8 are provided in pieces 6 and 7 near the rear edge. Whichever compartment of the feeder is designed for use with dry grain may be provided with drainage holes 10 through which not only chaff but also moisture may escape.

If this feeder is to be attached to the inside of the hutch door, or a wire-mesh fence, a fastener 11 consisting of a spring wire 12 having the end 13 bent at right angles is pushed through the holes 8 of the feeder and the end 13 hooked behind a vertical wire. This is most easily done while holding the feeder in one's hand and holding the feeder at an angle to the wire-mesh fence. The feeder is then turned back against the wire screen.

The free end of fastener 11 will now have the position shown in dotted lines at 15. The tip of the bent portion is now grasped and moved toward the left until the other end of the wire has passed some vertical wire of the screen, such as wire 16. The free end of the wire is now pushed in the direction of the arrow 17 until the end of wire 12 is behind the wire 16. The bent end 14 of the wire is now moved back into the position shown in Figure 3 and the other end of wire 12 slides into the full-line position shown in Figure 3. Since the fastener 11 is made of spring wire, the wire being bent, in attaching the feeder, tries to straighten out and so draws the feeder firmly against the screen wall.

In the modified form of the invention shown in Figure 4, the animals may approach the feeder from every side. The feed is contained in a dish 20 having sloping sides 21 with a curved upper edge 22 and a vertical outer side 23 having a toe 24. This dish is firmly attached by rivets, or in any other manner, to a plate 25 which extends out beyond the wall 23 a distance such that any animal poking against the wall 23 with his snout will have to be standing on the plate 25 with his forepaws. The effect of the poke of the animal's nose, and the back pull of his paws, will neutralize each other and there will be no net push or pull on the dish.

Above the dish 20 is an inclined guard wall 26 functioning in the same manner as the portion 1 of the metal sheet in Figure 2 to prevent an animal from jumping over the wall 23 into the feed hopper. This inclined wall 26 is supported on the dish 20 by inclined struts 27.

The inclined elevated wall 26 may also support part of a feed hopper 28 having an open bottom 30.

The dish 20 may have a central cone 29 which distributes feed coming down through the opening 30 equally around all sides of the dish. This cone also prevents a rabbit on one side who has his head in the feeder seeing another rabbit who is standing on the other side of the feeder and also has his head in the feeder. Were they to see each other while thus feeding, they would fight each other, throwing feed out of the feeder.

I claim:

1. A circular horizontal plate having a rim, a low wall enclosing a circle of smaller diameter than said plate and supported concentrically thereon to leave an annular space between said rim and said wall for the forefeet of animals, a top edge on said wall, an inverted conical feed holder concentric with said wall having a rim of the same diameter as said wall and supported on said top edge, a similar inverted guard cone concentric with the first cone, means to support the guard cone at a distance above said first cone sufficient to prevent animals passing their necks into the feed cone if their forefeet are on the top edge of said wall.

2. A circular horizontal plate having a rim, a low wall enclosing a circle of smaller diameter than said plate and supported concentrically thereon to leave an annular space between said rim and said wall for the forefeet of animals, a top edge on said wall, an inverted conical frustrum concentric with said wall and having an outer rim of the same diameter as said wall and supported on its top edge and also having a rim of smaller diameter below said outer rim, an upwardly projecting cone whose diameter is the same as that of the smaller rim of said frustrum with which it coincides, an inverted guard cone concentric with the first cone, means to support the guard cone at a distance above said first cone sufficient to prevent animals passing their necks into the feed cone if their forefeet are on the top edge of said wall.

References Cited in the file of this patent

UNITED STATES PATENTS

| | | |
|---|---|---|
| 848,492 | Rees | Mar. 26, 1907 |
| 1,113,842 | Sill | Oct. 13, 1914 |
| 1,560,729 | Randall | Nov. 10, 1925 |
| 1,838,324 | Olson | Dec. 29, 1931 |
| 1,993,445 | Hemstreet | Mar. 5, 1935 |
| 2,053,994 | Helm | Sept. 8, 1936 |
| 2,163,186 | Bergeron | June 20, 1939 |
| 2,166,982 | Wilson | July 25, 1939 |
| 2,254,585 | Travis | Sept. 2, 1941 |
| 2,259,682 | Collins | Oct. 21, 1941 |
| 2,545,105 | Niskala et al. | Mar. 13, 1951 |
| 2,583,203 | Bergeron | Jan. 22, 1952 |
| 2,607,318 | Collier et al. | Aug. 19, 1952 |
| 2,638,872 | Potter | May 19, 1953 |
| 2,640,224 | George | June 2, 1953 |
| 2,656,819 | Meier | Oct. 27, 1953 |
| 2,667,858 | Cussotti | Feb. 2, 1954 |
| 2,677,350 | Prestidge et al | May 4, 1954 |